US009787767B2

United States Patent
Itamoto et al.

(10) Patent No.: US 9,787,767 B2
(45) Date of Patent: Oct. 10, 2017

(54) CONTENT AND POSTED-INFORMATION LINK METHOD, AND INFORMATION PROCESSING TERMINAL

(71) Applicants: Shinichi Itamoto, Kawasaki (JP); Ryo Taya, Kawasaki (JP)

(72) Inventors: Shinichi Itamoto, Kawasaki (JP); Ryo Taya, Kawasaki (JP)

(73) Assignee: NEC Corporation, Tokyo (JP)

( * ) Notice: Subject to any disclaimer, the term of this patent is extended or adjusted under 35 U.S.C. 154(b) by 395 days.

(21) Appl. No.: 14/380,593

(22) PCT Filed: Feb. 27, 2013

(86) PCT No.: PCT/JP2013/055249
§ 371 (c)(1),
(2) Date: Aug. 22, 2014

(87) PCT Pub. No.: WO2013/133108
PCT Pub. Date: Sep. 12, 2013

(65) Prior Publication Data
US 2015/0039693 A1     Feb. 5, 2015

(30) Foreign Application Priority Data
Mar. 8, 2012   (JP) ................................. 2012-052238

(51) Int. Cl.
*G06F 15/16*      (2006.01)
*H04L 29/08*      (2006.01)
(Continued)

(52) U.S. Cl.
CPC ........ *H04L 67/104* (2013.01); *G06F 17/3089* (2013.01); *G06Q 10/10* (2013.01); *H04L 67/26* (2013.01)

(58) Field of Classification Search
USPC .......................... 709/204, 203, 223–229, 250
See application file for complete search history.

(56) References Cited

U.S. PATENT DOCUMENTS

2008/0120501 A1* 5/2008 Jannink ............ G06F 17/30017
713/163
2010/0057694 A1* 3/2010 Kunjithapatham
.......................... G06F 17/30781
707/E17.009
(Continued)

FOREIGN PATENT DOCUMENTS

JP    2010-273060 A    12/2010
JP    2011-234198 A    11/2011
(Continued)

OTHER PUBLICATIONS

Davis, et al. "Using Social Networking and Collections to Enable Video Semantics Acquisition", IEEE Multimedia, Jan. 1, 2009, 12 pages.
(Continued)

*Primary Examiner* — Zarni Maung
(74) *Attorney, Agent, or Firm* — Wilmer Cutler Pickering Hale and Dorr LLP

(57) ABSTRACT

An information processing terminal is connected to an external server via the information sharing system (WEB) so as to implement Twitter, social networking services, and text posting services. The information processing terminal is used to receive a desired content (e.g. a television broadcast content), to browse the posted information posted on the WEB from the external server, to select at least one classified information (e.g. hash tags) used to classify the posted information from among a plurality of classified information, to obtain at least one classified information with reference to the external server, and to simultaneously display at least one classified information linked with the desired content. The information processing terminal simultaneously displays a content display screen used to display the desired content and a posting service display screen used (Continued)

to display a plurality of posted information browsed from the external server.

8 Claims, 11 Drawing Sheets

(51) Int. Cl.
*G06Q 10/10* (2012.01)
*G06F 17/30* (2006.01)
*G06F 12/00* (2006.01)

(56) References Cited

U.S. PATENT DOCUMENTS

2011/0271303 A1 11/2011 Isozu et al.
2012/0124620 A1* 5/2012 Nishizawa ......... H04N 21/4316
    725/34

FOREIGN PATENT DOCUMENTS

JP    2012-034337 A    2/2012
JP    2012-042998 A    3/2012

OTHER PUBLICATIONS

Extended European Search Report corresponding European Application No. 13758265.6, dated Sep. 23, 2015, 6 pages.
International Search Report corresponding to PCT/JP2013/055249, dated Apr. 2, 2013 (3 pages).
Japanese Office Action issued in corresponding Japanese Patent Application No. 2014-503792, mail date Aug. 2, 2016, 9 pages.
Tatsuya Aiko, [Revision] Collection, Conversion, and Replay of Video Image in the Era of Full HD Images, Mac's Video Image Collections 2010, Mac Fan, vol. 18, No. 8, Japan, Mainichi Communications Inc., Aug. 1, 2010, vol. 18, pp. 76 to 79 (5 pages).
Twitter Perfect Guidebook, PC Fan, vol. 18, No. 8, Japan, Mainichi Communications Inc., Aug. 1, 2011, vol. 18, pp. 90 and 91 (3 pages).

* cited by examiner

FIG. 5

BROADCAST CONTENT INFORMATION TABLE (431)

| CONTENT ID | BROADCAST TIME ZONE | CONTENT-RELATED INFORMATION |
|---|---|---|
| 0001 | 2011.10.10.19:00-21:00 | BROADCASTING STATION A, BASEBALL GAME, HANSHIN, KYOJIN |
| 0002 | 2011.10.10.19:00-20:00 | BROADCASTING STATION B, MUSIC PROGRAM |
| 0003 | 2011.10.10.19:00-20:00 | BROADCASTING STATION C, DRAMA |
| 0004 | 2011.10.10.19:00-20:00 | BROADCASTING STATION D, COOKING PROGRAM |
| 0005 | 2011.10.10.20:00-21:00 | BROADCASTING STATION B, (JAPANESE ...) |

FIG. 6

CONTENT-RELATED HASH TAG TABLE (432)

| CONTENT-RELATED INFORMATION | REGISTERED HASH TAG | RELATED WORD |
|---|---|---|
| BASEBALL GAME | #yakyu | BASEBALL GAME, PITCHER, FIELDER, RELIEF PITCHER, ACTIVE, RETIRE, CURRENT SEASON, COMEBACK, DREAM, FA DECLARATION, HOMERUN, HIT, OUT, BALL, BOULSON, ... |
| HANSHIN | #hanshin / #tigers / #seri-gu | HANSHIN, TIGERS, ROKKO WIND, KOSHIEN, TOLUCKY, WADA, KANEMOTO, FUJIKAWA, ... |
| KYOJIN | #kyojin / #yomiuri / #giants / #seri-gu | KYOJIN, MISTER, TOKYO DOME, KORAUEN, GIABBIT, HARA, ABE, TAKAGI, SAWAMURA, OGASAWARA, ... |
| | | |
| | | |

FIG. 7

POSTED INFORMATION TABLE (433)

| POSTER ID | POSTED TIME | POSTED INFORMATION | POSTED HASH TAG |
|---|---|---|---|
| 11111 | 2011.10.01.00:01 | ××××× | #hanshin |
| 22222 | 2011.10.01.00:02 | ××××× | |
| ...... | ...... | ...... | ...... |
| 33333 | 2011.10.10.19:03 | NICE HIT! | #samurai_japan |
| 44444 | 2011.10.10.19:04 | ×××××× | #yakyu |
| 55555 | 2011.10.10.19:05 | CHEER UP HANSHIN ... | |
| 66666 | 2011.10.10.19:06 | ×××××× | #tolucky_jump |
| 77777 | 2011.10.10.20:07 | SHOW SOUL OF TIGERS! | |

FIG. 8

POSTED HASH TAG TABLE (434)

<BROADCAST TIME ZONE 2011.10.10.19 : 00-20 : 00>

| POSTED HASH TAG | POST COUNT |
|---|---|
| #tolucky_jump | 1589 |
| #giabbit_neru | 3965 |
| | |
| | |
| | |
| | |

CONTENT AND POSTED-INFORMATION LINK METHOD, AND INFORMATION PROCESSING TERMINAL

TECHNICAL FIELD

This application is a national stage application of International Application No. PCT/JP2013/055249 entitled "Content and Posted-Information Link Method, and Information Processing Terminal," filed on Feb. 27, 2013, which claims the benefit of the priority of Japanese Patent Application No. 2012-052238, filed Mar. 8, 2012, the disclosures of each are incorporated herein by reference in their entirety.

The present invention relates a content and posted-information link method, and an information processing terminal in an information sharing system.

BACKGROUND ART

Recently, mobile terminals such as smart phones, and tablet information processing terminals have become widespread. Additionally, mobile terminals having functions to receive television broadcasting waves and Internet-connecting functions have become widespread. Users (or subscribers) may view or browse audio-video contents with mobile terminals. Additionally, when users operate mobile terminals to post images or text data via social networking services such as Twitter (a trademark) and Facebook (a trademark), they may share the latest statuses among a plurality of users on the WEB (i.e. an information sharing system on the Internet), or they may mutually share their current thoughts.

Patent Literature Document 1 discloses a video content receiving device and a content information transmitting method, i.e. technologies to receive and decode video contents distributed via the Internet, to specify mobile terminals as destinations of transmitting content information, and to transmit content information to mobile terminals via network communications and near-field communications.

CITATION LIST

Patent Literature Document

Patent Literature Document 1: Japanese Patent Application Publication No. 2010-273060

SUMMARY OF INVENTION

Technical Problem

However, when users operate mobile terminals to post text data or search desired posted information via social networking services, users need to input characters and numbers by use of operation buttons of mobile terminals with operation screens displayed on touch panels; this may cause a problem of operability for users.

The present invention aims to solve the above problem. It is an object of the present invention to provide a method of linking audio-video contents with posted information in an information sharing system (WEB), and an information processing terminal implementing a content and posted-information link method.

Solution to Problem

The present invention is directed to an information processing terminal including: an output part which selectively outputs an arbitrary input content and posted information posted on an information sharing system; a storage unit which stores a plurality of classified information used to classify the posted information based on an output-enable content of the output part; and an output control part which selectively sends at least one classified information to the output part.

The present invention is directed to an information processing method, comprising: selectively outputting an arbitrarily input content and posted information posted on an information sharing system; storing a plurality of classified information used to classify the posted information based on an output-enable content; and selecting at least one classified information.

The present invention is directed to an information processing terminal connectable to an external server via an information sharing system. The information processing terminal implements a content and posted-information link method comprising: receiving a desired content; browsing posted information posted on the information sharing system from the external server; selecting at least one classified information, used to classify the posted information, from among a plurality of classified information stored in advance or obtaining at least one classified information with reference to the external server; and simultaneously displaying the at least one classified information linked with the desired content.

Advantageous Effects of Invention

According to the present invention, it is possible to provide users of information terminals with information relating to desired contents. For example, it is possible to automatically display contents linked with posted information by means of simple operations to post text data via social networking services or to select, by users, classification information (e.g. hash tags) displayed on information processing terminals when users browse posted information of other companies. Thus, it is possible to improve users' operations with information processing terminals.

BRIEF DESCRIPTION OF DRAWINGS

FIG. 5 is a table describing an example of the stored content of a broadcasting content information table in a server.

FIG. 6 is a table describing an example of the stored content of a content-linked hash tag table in a server.

FIG. 7 is a table describing an example of the stored content of a posted information table in a server.

FIG. 8 is a table describing an example of the stored content of a posted hash tag table in a server.

DESCRIPTION OF EMBODIMENTS

Figure 1:
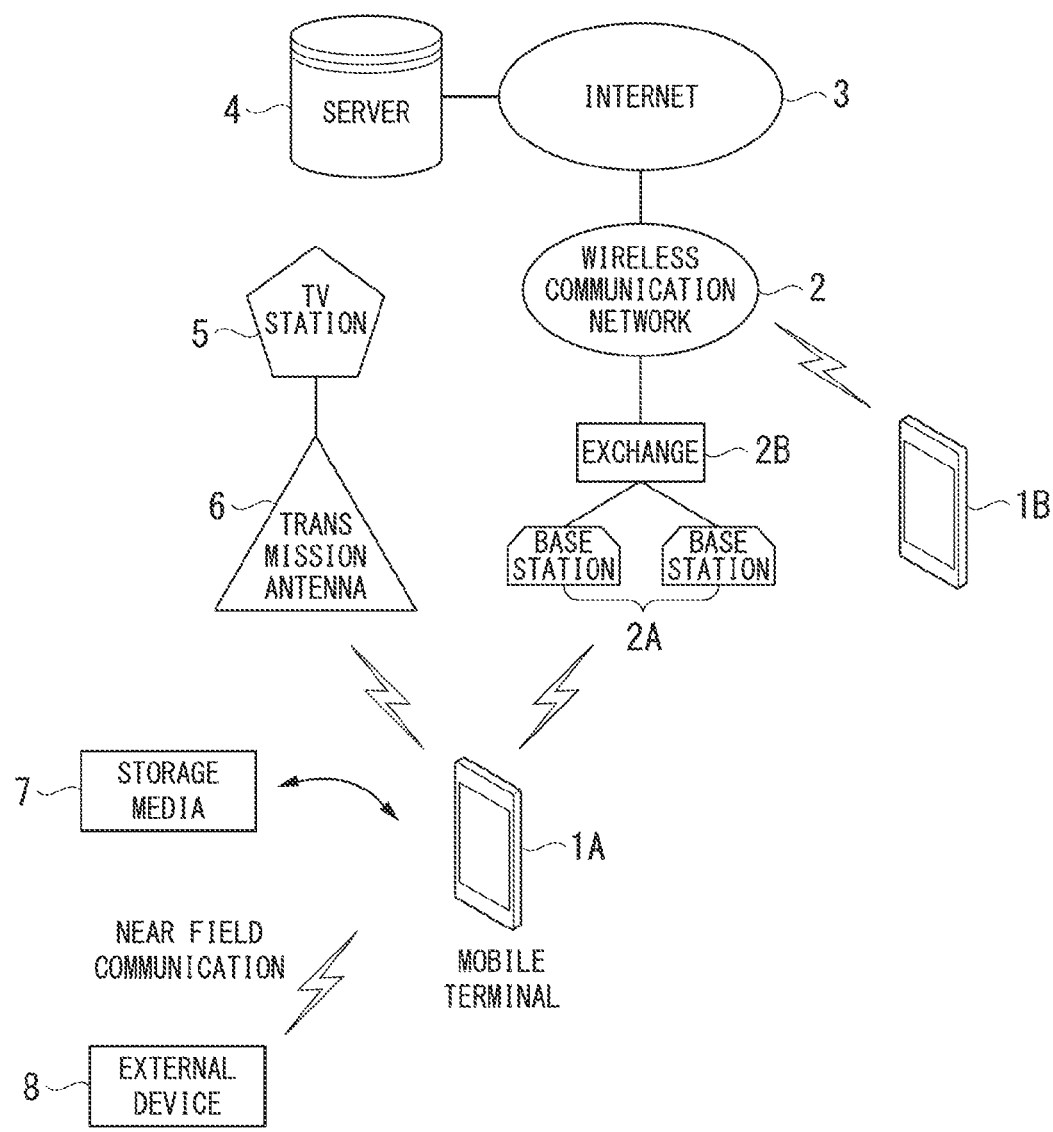
FIG. 1 is a configuration diagram diagrammatically showing a communication network system adopting an information processing terminal according to the embodiment of the present invention.

FIG. 1 diagrammatically shows a communication network system or an information sharing system (WEB) according to the preferred embodiment of the present invention. The present embodiment applies mobile terminals 1 (1A, 1B), serving as information processing terminals, to a communication network system. The present invention is not necessarily limited to this embodiment; hence, it is possible to employ smart phones, portable game devices, PDA (Personal Digital Assistant), tablet PC, notebook PC (Personal Computer) as information processing terminals.

For example, a mobile terminal 1 installs a communication function, an electronic mail function, an Internet connecting function (a Web access function), and television functions (i.e. a television broadcast reception function and a recording function) to receive and view digital television broadcasts (e.g. one-segment terrestrial digital television broadcasts). The recording function may have a function to record audio contents in addition to a function to record video contents received via television broadcasting.

The mobile terminal 1A is connected to wireless communication network (a mobile communication network) 2 via a nearby base station 2A and an exchange 2B. Thus, the mobile terminal 1A is placed in the condition to communicate with the other mobile terminal 1B via the wireless communication network 2. Upon being connected to the Internet 3 via the wireless communication network 2, the mobile terminal 1A is able to access a desired Web site and browse desired information. Additionally, the mobile terminal 1A installs a streaming function to download and reproduce multimedia content data such as moving pictures, still pictures, music, and news from a server 4 via the wireless communication network 2 and the Internet 3.

The mobile terminal 1A is able to receive terrestrial digital broadcast content data being transmitted via a transmission antenna 6 of a TV station 5. The mobile terminal 1A may serve as an Internet radio to receive and download digital broadcast contents from the server 4 via the wireless communication network 2 and the Internet 3. Thus, the mobile terminal 1A is able to receive broadcast content data via the television function while downloading streaming contents via the Internet connecting function. Additionally, the mobile terminal 1A is able to read various content data from recording media 7 such as detachable portable memory cards and to acquire various content data from the other mobile terminal 1B or an external device 8 via near field communications such as Bluetooth (a trademark) communications and infrared communications.

Figure 2:
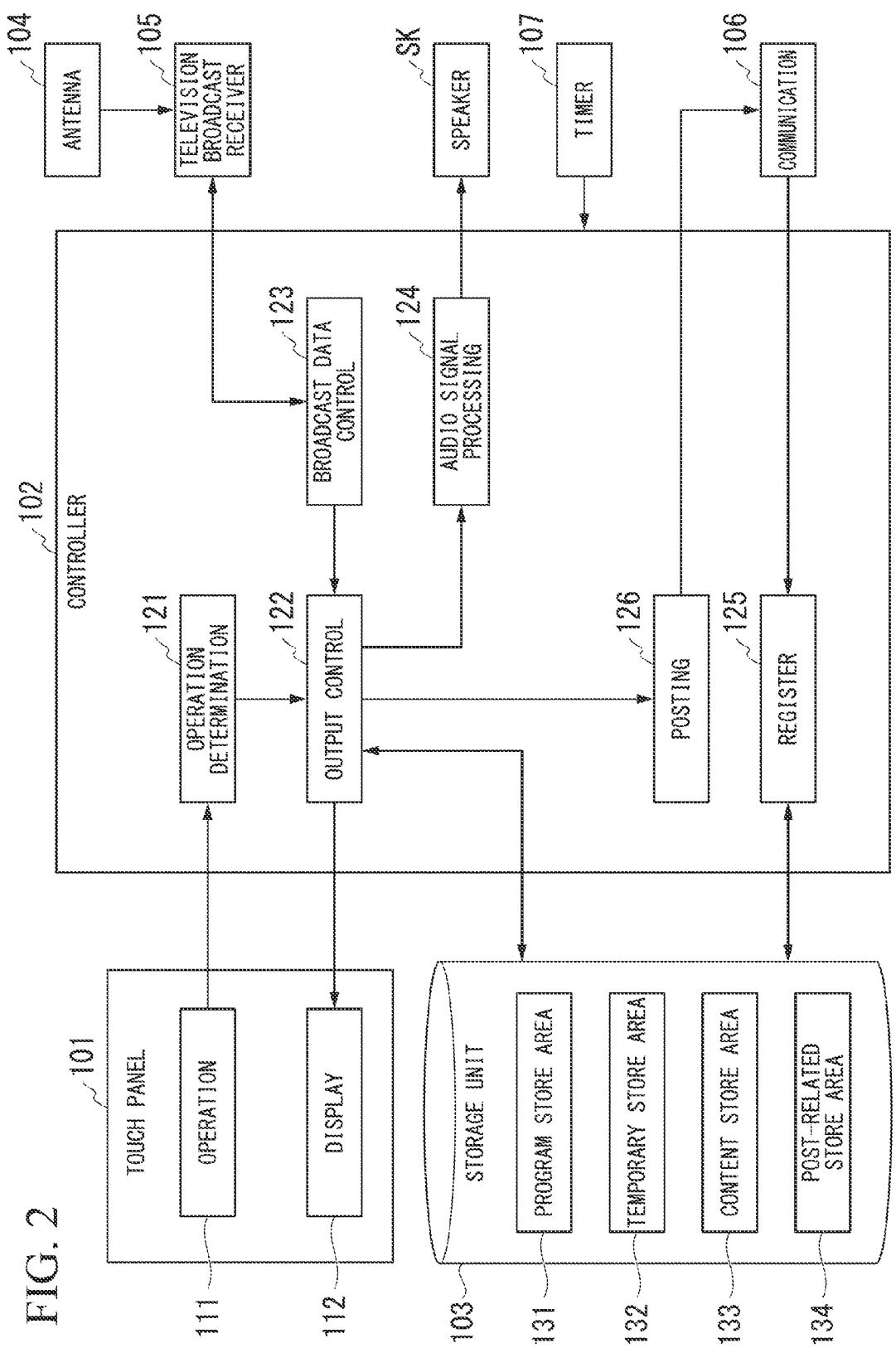
FIG. 2 is a block diagram showing basic constituent elements of a mobile terminal serving as an information processing terminal according to the embodiment of the present invention.

FIG. 2 is a block diagram showing basic constituent elements of the mobile terminal 1A. The mobile terminal 1A includes a touch panel 101, a controller 102, a storage unit 103, an antenna 104, a television broadcast receiver 105, a communication part 106, a timer 107, and a speaker SK. It is possible to install part of functions and constituent elements included in the mobile terminal 1A in the server 4. For example, it is possible to install the function of the controller 102 in the server 4.

The touch panel 101 includes an operation part 111 and a display 112. The operation part 111 includes sensors to receive user's operations so as to output the detection results of sensors to the controller 102. The operation part 111 includes sensors to detect the touch position of a user's finger on the operation screen in a certain interval of time, thus outputting the detection results of sensors. The present invention is not necessarily limited to this embodiment. For example, it is possible to employ noncontact sensors to detect the position of a user's finger or an operation indicating member (e.g. a stylus pen) approaching the operation screen.

The display 112 displays the predetermined display contents under the control of the controller 102. The display 112 is integrally combined with the operation part 111 to form the touch panel 101, wherein the operation part 111 displays the operation screen to receive user's operations. The display 112 forms an output part as well.

The controller 102 reads various pieces of information stored in the storage unit 103 so as to control the overall function of the mobile terminal 1A. The controller 102 includes an operation determination part 121, an output control part 122, a broadcast data control part 123, an audio signal processing part 124, a register 125, and a posting part 126.

The operation determination part 125 determines a user's operation received by the operation part 11 based on the detection result of the operation part 111. With reference to the touch position and the touch time of a user's finger indicated by the operation part 111, for example, the operation determination part 121 determines a user's operation, specified by the movement of a user's finger, based on the positional relationship between the movement of a user's finger and an image displayed on the display 112 upon receiving a user's operation.

For example, when the operation part 111 detects that a user's finger touches an icon or a text message on the display screen, the operation determination part 121 determines that the movement of a user's finger indicates a touch operation. When the operation part 111 detects that a user's finger is moving in a desired direction while a user's touch operation indicates a desired icon or a desired operation area, the operation determination part 121 determines that the movement of a user's finger indicates a slide operation. Additionally, the operation determination part 121 determines a user's operation received by the operation part 111 based on the date-time information measured with the timer 107.

The operation determination part 121 may instruct the output control part 122 to display the content suited to a user's operation based on the determination result. For example, when a user's operation is determined as a touch operation, the operation determination part 121 may instruct the output control part 122 to display an icon, indicating the touch position of a user's finger, such that the icon will be superimposed on the operation screen. Alternatively, the operation determination part 121 may instruct the output control part 122 to display a finger icon at the touch position of a user's finger on the display screen.

Based on a user's operation indicated by the determination result of the operation determination part 121, the output control part 122 controls the display 112 to display a desired image or the audio processing part 124 to generate the predetermined sound from the speaker SK. The output control part 122 executes a content screen display process to display a desired content on the display 112 and a posting screen display process to display a posting service display screen, which is used to post information via the WEB, on the display 112. The output control part 122 is able to switch a concurrent display mode and a single display mode based on the user's setting. The concurrent display mode allows the display 112 to concurrently display the content display screen and the posting service display screen juxtaposed together in a single screen, while the single display mode allows the display 112 to display either the content display screen or the posting service display screen. Specifically, when a user specifies either the concurrent display mode or the single display mode, the output control part 122 switches the type of a screen displayed on the display 112 in accordance with the specified mode.

When a user operates the operation part 111 to reproduce a recorded content, the output control part 122 reads the content data specified by a user from the storage unit 103 so as to display an image corresponding to the content data on the display 112 while generating sound corresponding to the content data from the speaker SK via the audio signal processing part 124.

The present embodiment is designed to set a real time mode to receive and display digital broadcast content data in real time and a recording mode to temporarily store the content data in the storage unit 103 and then display it. In the real time mode, the broadcast data control part 123 instructs the display 112 to display the digitally-modulated content data, input from the television broadcast receiver 105, on the display 112. In the recording mode, the broadcast data control part 123 stores the digitally-modulated content data, input from the television broadcast receiver 105, in the storage unit 103.

The audio signal processing part 124 inputs a received baseband signal modulated with the output control part 122 so as to generate sound from the speaker SK based on the received baseband signal.

The register 125 stores the information received with the communication part 106 and the content data input from the broadcast data control part 123 via the output control part 122 in the storage unit 103.

The posting part 126 submits the posted information created by a user onto the WEB via the communication part 106. The detailed processing of the posting part 126 will be described later with reference to FIG. 3.

The storage unit 103 stores various pieces of information used for the processing of the mobile terminal 1. For example, the storage unit 103 includes a program store area 131, a temporary store area 132, a content store area 133, and a post-related store area 134. For example, the storage unit 103 may include detachable portable memory devices (recording media) such as SD cards (Secure Digital Card) and IC cards. Alternatively, the storage unit 103 can be installed in an external server (not shown).

The program store area 131 is used to store various programs and applications to achieve the functionality of the present invention according to user's operations. The temporary store area 132 is a working area used to temporarily store various pieces of information facilitating the operation of the mobile terminal 1. The content store area 133 is used to store content data, e.g. television broadcast content data received with the television broadcast receiver 105. The content store part 133 is used to store content IDs, received together with content data, and content-related information representing attributes of content data. Content IDs are unique identifications assigned to content data. For example, the content-related information includes the names of TV stations broadcasting television programs as content data and the information representing the contents of television programs (e.g. names of genres and names of casts). The post-related store area 134 is used to store the posted information and related information on the WEB.

The antenna 104 receives radio waves having frequencies allocated to television broadcasting so as to send television broadcast signals corresponding to the received radio waves to the television broadcast receiver 105. The television broadcast receiver 105 combined with the antenna 104 achieves a television function to receive program information including electronic programs (EPG information: Electronic Program) and content-related information relating to content data in addition to content data of one-segment terrestrial digital television broadcast toward the mobile terminal 1A. The television broadcast receiver 105 includes analog circuitry used to extract broadcast data of preselected channels from television broadcast data received via the television antenna 104, and digital circuitry used to carry out digital modulation on television broadcast data. For example, digital circuitry carries out OFDM (Orthogonal Frequency Division Multiplexing) demodulation on broadcast data, separates and decodes video, audio, and data (e.g. character data) from the multiplexed television broadcast data, and decompresses compressed data.

The communication part 106 is connected to the wireless communication network 2 and the Internet 3 via the base station 2A and the exchange 2B. For example, the communication part 106 receives the posted information transmitted from the server 4 via the Internet 3. The timer 107 clocks the current date and time to output date-time information.

Figure 3:
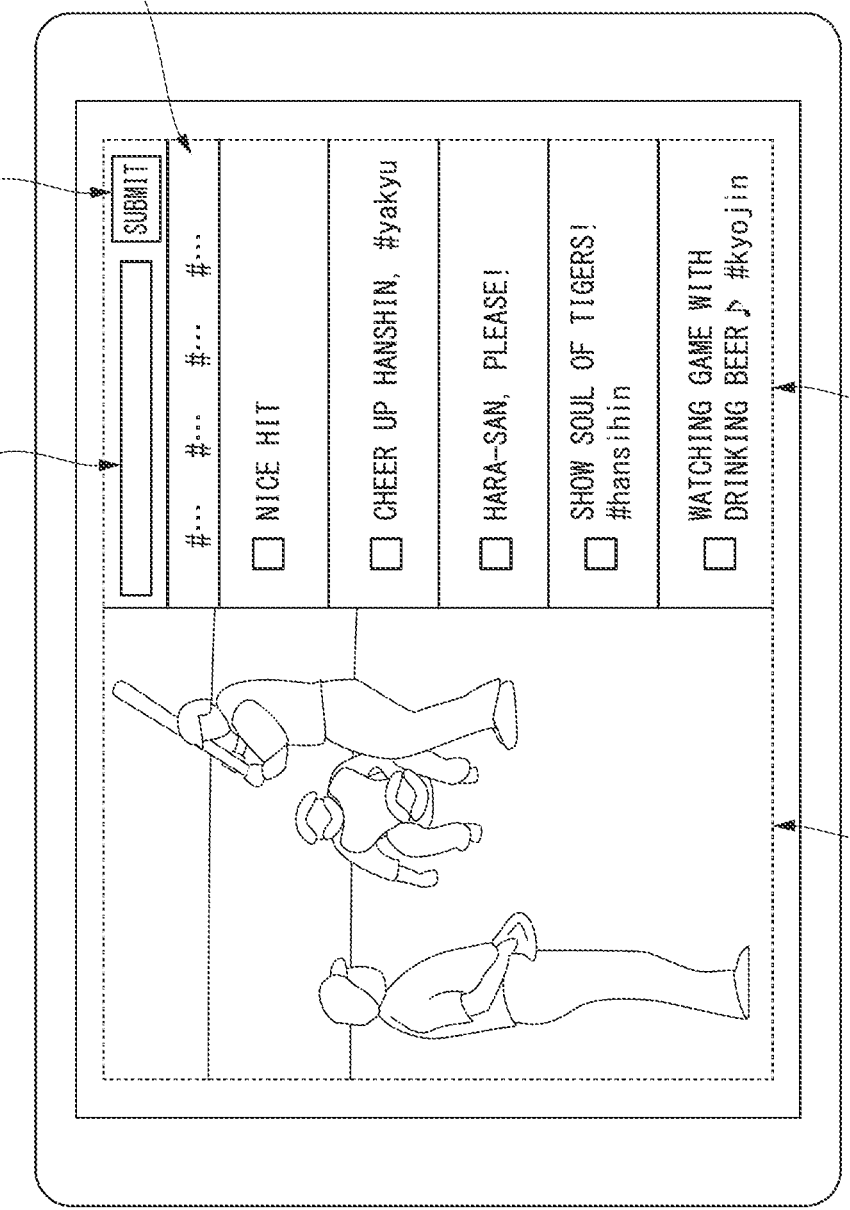
FIG. 3 is an illustration showing an example of a concurrent display mode displaying a content display screen and a posting service display screen with a display of a mobile terminal

Next, an example of a screen display on the display 112 of the touch panel 101 will be described with reference to FIG. 3. FIG. 3 shows an example of a display screen of a concurrent display mode used to concurrently display the content display screen and the posting service display screen. As shown in FIG. 3, the entire screen of the display 112 is divided into two sections in a horizontal direction, wherein the left-side screen serving as the content display screen is used to display content data while the right-side screen serving as the posting service display screen is used to display the posted information on the WEB. Herein, the broadcast program of a baseball game is displayed on the content display screen while the posted information relating to the broadcast program of a baseball game is displayed on the posting service display screen. The contents of services provided by Twitter are displayed on the posting service display screen. A plurality of pieces of posted information is displayed in a row on the posting service display screen. A plurality of pieces of posted information is displayed in a row in a time-series manner depending on the posted times.

An input field 1001 used to input posted information, a submit button 1002, and a classified information specification field 1003 are displayed on the posting service display screen. The input field 1001, the submit button 1002, and the classified information specification field 1003 are operation screens used to receive user's touch operations and slide operations. When a user's touch operation is applied to the input field 1001, the operation determination part 12 determines that a user gives an instruction to start inputting posted information. When a user's touch operation is applied to the submit button 1002, the operation determination part 121 determines that a user gives an instruction to submit the posted information via Twitter. When a user's touch operation is applied to the classified information (e.g. a hash tag) displayed in the classified information specification field 1003, the operation determination part 121 determines that a user gives an instruction to input data into the input field 1001. To display plenty of hash tags larger than the maximum number of hash tags displayable in the classified information specification field 1003, a user may apply a slide operation with the classified information specification field 1003 so as to display the other classified information, embedded under the posting service display screen, on the display 112.

Next, the function of the posting part 126 will be described in detail. When a user's touch operation is applied to the input field 1001 used to input posted information on the posting service display screen, the posting part 126 receives the posted information so as to generate a hash tag request signal requesting hash tags relating to the video content on the content display screen of the display 112 and the audio content generated from the speaker SK. The hash tag request signal includes a content ID representing the audio-video contents currently reproduced via the display 112 and the speaker SK, and a poster ID specifying a poster. The posting part 126 transmits a hash tag request signal to the server 4 via the communication part 106. As the poster ID, it is possible to use a terminal ID representing the mobile terminal 1A.

Upon receiving a hash tag request signal, the server 4 determines a hash tag in response to the hash tag request signal. The process of determining hash tags will be described later. Upon receiving a user's input start instruction regarding posted information, the output control part 122 receives a hash tag, relating to the audio-video contents being currently reproduced, from the server 4 so as to display the hash tag on the display 112.

The output control part 122 may receive a hash tag, relating to the audio-video contents, from the server 4 so as to display the hash tag in the classified information specification field 1003. Alternatively, the output control part 122 may automatically display a hash tag, which is received in addition to the posted information, in the input field 1001. The output control part 122 does not necessarily display hash tags received from the server 4 on the display 112 but can display hash tags stored in the storage unit 103 of the mobile terminal 1A. For example, hash tags received together with information representing names of broadcast stations, channel numbers, and names of programs are stored in the storage unit 103 when the mobile terminal 1A receives content data of television programs. When the contents of television programs are displayed on the display part 112, hash tags relating to television programs are already stored in the storage unit 103. Upon displaying the contents of television programs on the display 112, the output control part 122 can display hash tags, relating to television programs displayed on the display 112, on the display 112.

When a user's touch operation is applied to a hash tag displayed in the classified information specification field 1003 during an operation to input posted information, the posting part 126 receives the hash tag in addition to the posted information. The posting part 126 may insert a hash tag into a text message being currently created or add a hash tag to the end of a text message. Upon receiving a hash tag related to any content from the server 4, the posting part 126 may automatically add a hash tag to the posted information without waiting for a user's operation to designate a hash tag.

When the displayed content of the content display screen is changed to another content on the display 112 during an operation to input posted information, the posting part 126 may generate a hash tag request signal, including a content ID representing the changed display content of the content display screen and a terminal ID of the mobile terminal 1A, so as to transmit the hash tag request signal to the server 4. In the above, the terminal ID is used as the poster ID; but this is not a restriction. As the poster ID, for example, it is possible to use a user ID, which a poster registers in a posting information service, or a user ID used to specify a poster logging in the mobile terminal 1A. As described above, when the video content of the content display screen and the audio content of the speaker SK are changed to other contents during an operation to input posted information, the output control part 122 may receive hash tags relating to the changed audio-video contents from the server 4 so as to display them in the classified information specification field 1003 and the input field 1001.

When a user's touch operation is applied to the submission button 1002, the posting part 126 transmits the posted information to the server 4 in relation to the terminal ID. At this time, the posting part 126 may generate a hash tag request signal requesting hash tags relating to the video content displayed on the content display screen of the display 112 and the audio content generated from the speaker SK, thus transmitting the hash tag request signal to the server 4. Upon receiving the posted information from the mobile terminal 1A, the server stores the posted information in a storage unit (not shown). Additionally, the server 4 communicates with the mobile terminal 1A to update the posted information displayed on the posting service display screen of the display 112. Upon receiving a hash tag request signal from the mobile terminal 1A, the server 4 determines a hash tag in correspondence with the hash tag request signal. The process of determining hash tags will be described later. Upon receiving an instruction to stop inputting posted information (i.e. a posting complete instruction), the output control part 122 receives a hash tag relating to the audio-video contents being currently reproduced from the server 4 so as to display the hash tag on the display 112.

In the present embodiment, the posting part 126 generates a hash tag request signal including a content ID representing the content being currently reproduced. The content ID included in a hash tag request signal may represent the television broadcast content being currently broadcasted, the reproduced television broadcast content which was broadcasted and recorded in the past, or the content distributed via streaming.

In the present embodiment, the function of the posting part 126 is not necessarily limited to the foregoing function. For example, the posting part 126 may generate a hash tag request signal including a content ID representing the output-enabled content. As the output-enabled content, it is possible to name the broadcast content being currently broadcasted from a TV station, the content being currently received with the mobile terminal 1A, and the content being currently recorded with the mobile terminal 1A. For example, when the television broadcast content being currently broadcasted is displayed on the content display screen of the display 112, the posting part 126 may generate a hash tag request signal including a content ID representing the content of the other broadcast program being currently broadcasted from the other TV station. When the broadcast content of the other program is displayed on the content display screen of the display 112 during recording of a desired content, the posting part 126 may generate a hash tag request signal including a content ID representing the content being currently recorded.

When a user gives an instruction to display previously posted information on the posting service display screen (i.e. a posted information browsing instruction) in the content output-enable condition on the content display screen of the display 112, the posting part 126 transmits a hash tag request signal requesting hash tags relating to output-enable contents to the server 4. Upon receiving a hash tag relating to the output-enable content from the server 4, the posting part 126 displays the hash tag in the classified information specification field 1003. Thereafter, when a user's touch operation is applied to a hash tag displayed in the classified information specification field 1003, the posting part 126 generates a post-browse request signal to request extracting and transmitting the posted information, relating to the hash tag, from the previously posted information. The post-browse request signal includes a hash tag specified by a user and the terminal ID of the mobile terminal 1A. The posting part 126 displays the search result of a search part (not shown) of the server 4 on the posting service display screen of the display 112.

The mobile terminal 1A of the present embodiment is able to display the classified information (hash tags) corresponding to output-enable contents on the content display screen of the display 112. In the present embodiment, the classified information specification field 1003 is displayed on the posting service display screen of the display 112; but this is not a restriction. It is possible to display the classified information specification field 1003 on the content display screen of the display 112. The classified information (hash tags) corresponding to the contents displayed on the content display screen of the display 112 is displayed in the classified information specification field 1003; but this is not a restriction. For example, it is possible to directly display the classified information in the input field 1001 so as to regard the classified information as the posted information. By displaying the classified information (hash tags), corresponding to the contents displayed on the content display screen, on the display 112, it is possible for a user to arbitrarily select the classified information, or it is possible to automatically input the posted information.

Figure 4:
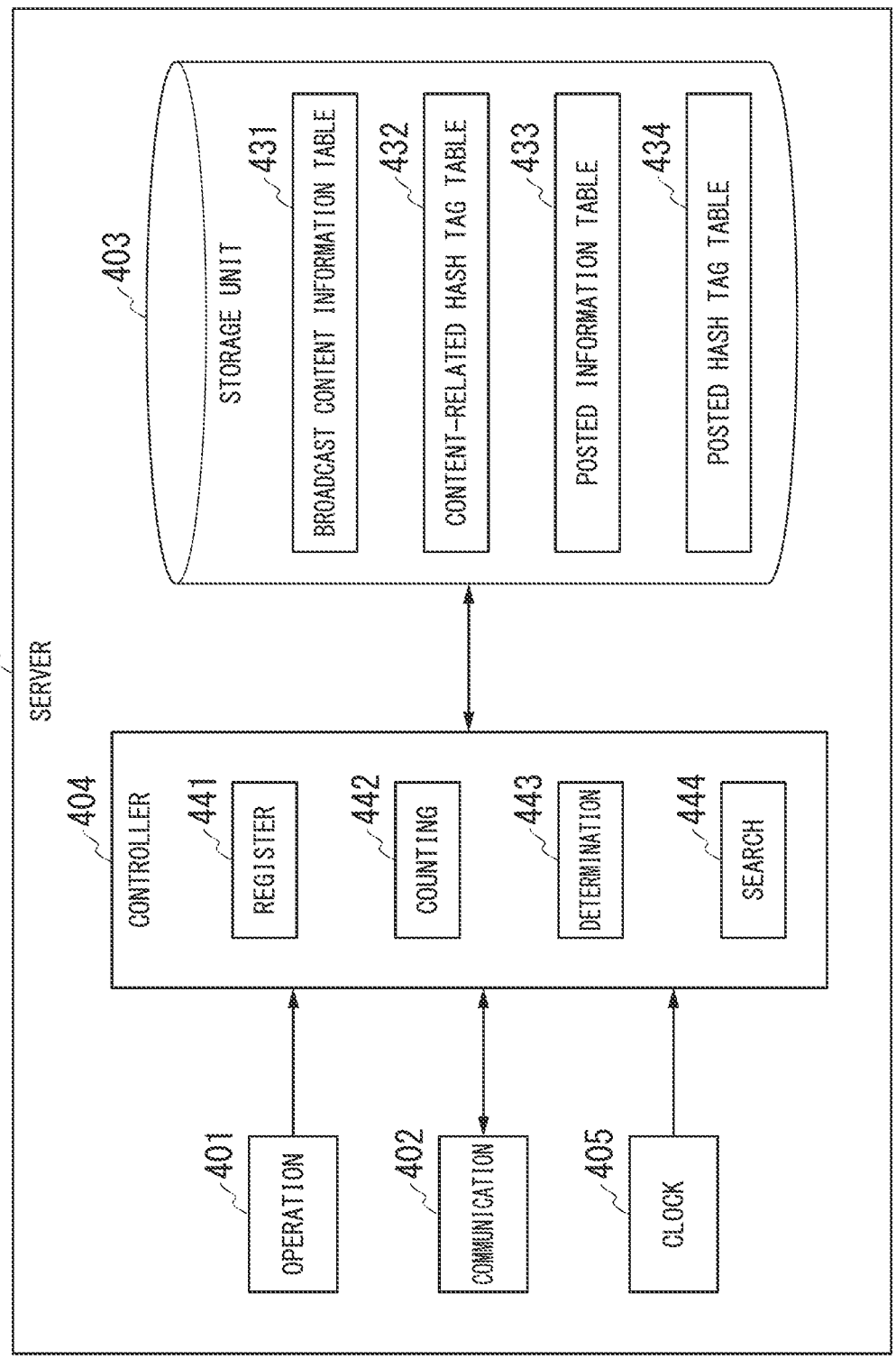
FIG. 4 is a block diagram showing an example of a server configuration.

Next, the server 4 will be described with reference to FIG. 4. FIG. 4 is a block diagram showing an example of the configuration of the server 4. The server 4 includes an operation part 401, a communication part 402, a storage unit 403, a controller 404, and a clock 405. It is possible to partially install the constituent elements and functions of the server 4 in the mobile terminal 1A. For example, it is possible to install the function of the controller 404 of the server 4 in the mobile terminal 1A. The operation part 401 receives the operation of an administrator of the server 4 to output an operation signal. The communication part 402 communicates with the mobile terminal 1A via the wireless communication network 2 and the Internet 3. The storage unit 403 includes a broadcast content information table 431, a content-related hash tag table 432, a posted information table 433, and a posted hash tag table 434.

FIG. 5 shows an example of the stored content of the broadcast content information table 431. The broadcast content information table 431 stores content IDs, broadcast time zones, and content-related information in a coordinated manner. As the broadcast contents, it is possible to name audio-video contents of digitally broadcast television programs, audio contents of Internet radios, and audio contents via music distribution. The following description refers to broadcast contents representing audio-video contents of digitally broadcast television programs. The broadcast time zone refers to the predetermined time zone of broadcasting contents or the predetermined time zone of distributing broadcast contents. The content-related information refers to the predetermined information relating to broadcast contents. With respect to the broadcast content representing the audio-video content of a television program, the content-related information includes the name of a program, the name of a broadcasting station, the names of casts, the genre name of a program, and the other information relating to a program. The content-related information may refer to the predetermined information determined by a producer station or a broadcasting station broadcasting a television program, or the information determined by an administrator of the server 4.

FIG. 6 shows an example of the stored content of the content-related hash tag table 432. The content-related hash tag table 432 stores content-related information, hash tags, and related words in a coordinated manner. The content-related information of the content-related hash tag table 432 is identical to the content-related information of the broadcast content information table 431. With respect to the content-related information including a plurality of items, one item is stored in each row of the content-related hash tag table 432. That is, each row of content-related hash tag table 432 stores one item as the content-related information. Hash tags are used to specify each row of content-related information. Related words are keywords relating to each row of content-related information. Related words are words, which may be written by users who have interests in each row of content-related information into posted information.

Hash tags indicate classified information used for Twitter. When a user submits posted information, including a hash tag, from the mobile terminal 1A to the server 4, it is possible for the server 4 to classify the posted information including a hash tag from the other posted information including no hash tags. Additionally, hash tags may be used as search keys in order to solely search the posted information including a hash tag from a plurality of posted information. The search process using hash tags as search keys may be beneficial for users who positively intend to submit content-related information indicated by hash tags. Owing to the search process using keywords included in posted information, it is possible to search the posted information relating to keywords, whereas a user cannot execute the search process without submitting a character string including a desired keyword, which may present an obstacle to user's submission using free character strings. Additionally, keywords equally described with sentences being submitted likely baffle the understanding of the submitted sentences. For this reason, hash tags are used to facilitate the method of correlating a plurality of posted information without using keywords. Hash tags are created by adding the sharp symbol "#" at the top of a character string representing a keyword denoted using alphabetic letters, Chinese characters, hiragana letters, or katakana letters, and therefore each user may freely determine hash tags except for the notation of inputting spaces before and after each keyword. Therefore, each user may generate a character string serving as a keyword.

FIG. 7 shows an example of the stored content of the posted information table 433. The posted information table 433 stores poster IDs, post times, posted information, and hash tags in a coordinated manner. Poster IDs are unique identifications used to specify posters. In the present embodiment, each user may use a poster ID representing the unique terminal ID allocated to the mobile terminal 1A which each user operates to transmit posted information. The post time indicates the date and time at which the server 4 receives the posted information from the mobile terminal 1A. In the present embodiment, the posted information stored in the posted information table 433 refers to a character string at least precluding a hash tag from the user's posted information. Hash tags are included in posted information.

FIG. 8 shows an example of the stored content of the posted hash tag table 434. The posted hash tag table 434 stores posted hash tags and post counts in a coordinated manner. The posted hash tag table 434 stores post counts and hash tags, which are counted with respect to posted information in a post time zone. Hash tags stored in the posted hash tag table 434 are included in the posted information received in the predetermined post time zone.

In FIG. 4, the controller 404 includes a register 441, a counting part 442, a determination part 443, and a search part 444. The register 441 registers the posted information received from the mobile terminal 1A in the posted information table 433 of the storage unit 403. Specifically, when the server 4 receives the posted information from the mobile terminal 1A via the communication part 402, the register 441 acquires a registration time representing the data-time information output from the clock 405 at reception of the posted time. Additionally, the register 441 acquires a poster ID representing the terminal ID of the mobile terminal 1A correlated to the registration information. Moreover, the register 441 determines as to whether or not any hash tags are included in the posted information. With respect to the posted information including a hash tag, the register 441 deletes the hash tag from the posted information while acquiring the hash tag. The posted information is written into the posted information table 433 in connection with the post time and the poster ID (including a hash tag).

The counting part 442 counts the number of posted information stored in the posted information table 433 at the predetermined timing, thus producing the post count for each hash tag included in the posted information. After obtaining the counting result of the counting part 442, hash tags obtained from the posted information and post counts are written into the posted hash tag table 434 in a coordinated manner.

Upon receiving a hash tag request signal from the mobile terminal 1A, the determination part 443 determines a hash tag (i.e. a hash tag displayed on the display 112 of the mobile terminal 1A) in correspondence with the hash tag request signal. In the present embodiment, the determination part 443 executes one of two hash tag determination methods or a combination of two hash tag determination methods. In this connection, the method how to execute two hash tag determination methods is determined in advance.

According to the first hash tag determination method, the determination part 443 determines one of hash tags registered in the content-related hash tag table 432 as a hash tag corresponding to a hash tag request signal received from the mobile terminal 1A. Hereinafter, the first hash tag determination method will be referred to as a registered hash tag determination method.

According to the second hash tag determination method, the determination part 443 determines one of hash tags registered in the posted information table 433 as a hash tag corresponding to a hash tag request signal received from the mobile terminal 1A. Hereinafter, the second hash tag determination method will be referred to as a posted hash tag determination method.

Next, an example of the registered hash tag determination method will be described. The determination part 443 determines as to whether or not a content ID is included in a hash tag request signal. Specifically, with respect to a hash tag request signal including a content ID, the determination part 443 obtains the content-related information corresponding to the content ID with reference to the broadcast content information table 431 of the storage unit 403. At this time, the determination part 443 may obtain a broadcast time zone corresponding to the date and time of receiving a hash tag request signal, and the content-related information corresponding to the content ID of a hash tag request signal. Additionally, the determination part 443 obtains a registered hash tag corresponding to the content-related information with reference to the content-related hash tag table 432 of the storage unit 403. The determination part 443 determines the registered hash tag as the hash tag corresponding to the hash tag request signal received from the mobile terminal 1A.

Next, the posted hash tag determination method will be described. Similar to the above, with respect to a hash tag request signal including a content ID received from the mobile terminal 1A, the determination part 443 obtains the content-related information corresponding to the content ID with reference to the broadcast content information table of the storage unit 403. Additionally, the determination part 443 obtains a related word corresponding to the content-related information with reference to the content-related hash table 432 of the storage unit 403. Moreover, the determination part 443 searches the posted information including the related word with reference to the posted information table 433 of the storage unit 403. Upon successfully searching the posted information including the related word, the determination part 443 obtains a posted hash tag included in the posted information with reference to the posted information table 433. Thereafter, the determination part 443 determines the posted hash tag as a hash tag corresponding to a hash tag request signal received from the mobile terminal 1A.

The search part 444 searches the posted information corresponding to a post-browse request signal received from the mobile terminal 1A. Specifically, the search part 444 searches the posted information corresponding to a hash tag included in a post-browse request signal with reference to the posted information table 433. Thereafter, the search part 444 transmits the search result (i.e. posted information) to the mobile terminal 1A.

Figure 9:
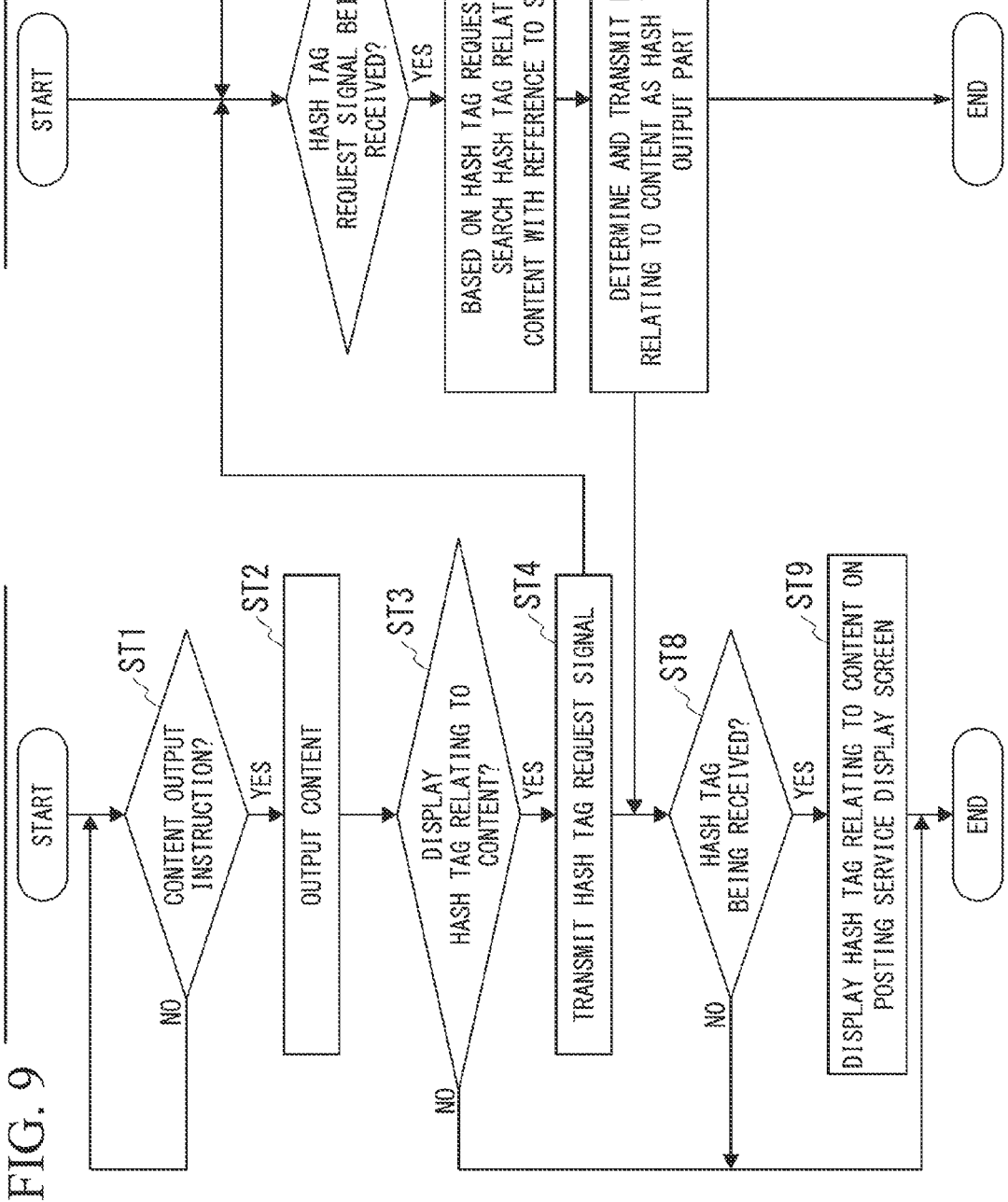
FIG. 9 is a flowchart showing a content and posted-information link method applied between a mobile terminal and a server.

Next, a content and posted-information link method applied between the mobile terminal 1A and the server 4 will be described with reference to FIG. 9. In the flowchart shown in FIG. 9, the mobile terminal 1A and the server 4 cooperate together to carry out processes; but this is not a restriction. When the present embodiment needs part of the constituent elements and functions of the server 4 so as to partially install them in the mobile terminal 1A, it is possible for the mobile terminal 1A to carry out all the processes of the flowchart of FIG. 9. Alternatively, when the present embodiment needs part of the constituent elements and functions of the mobile terminal 1A so as to install them in the server 4, it is possible for the server 4 to carry out all the processes of the flowchart of FIG. 9. The processing of the flowchart of FIG. 9 will be described below with respect to each step.

(Step ST1)

The controller 102 of the mobile terminal 1A determines as to whether or not a user operates the operation part 111 of the touch panel 101 to give a content output instruction. For example, when a user's operation indicates an instruction to display the television broadcast content on the display 112 of the touch panel 101, the operation determination part 121 determines that a user gives an instruction to output the television broadcast content, thus sending the determination result to the output control part 122. The output control part 122 designates a channel of a broadcasting station currently broadcasting the television broadcast content displayed on the display 112. Alternatively, the output control part 122 designates the recorded content of the television broadcast content which was previously broadcast by a broadcasting station and recorded in the storage unit 103.

(Step ST2)

Based on the determination result of the operation determination part 121, the output control part 122 sends audio-video contents to the display 112 and the audio signal processing part 124. For example, the output control part 122 displays video data of the television broadcast content on the display part 112 based on the television broadcast content data which the broadcast data control part 123 receives via the television broadcast receiver 105. Based on the television broadcast content data including sound received with the mobile terminal 1A which is set to reproduce sound, the output control part 122 sends the audio data of the television broadcast content data to the audio signal processing part 124 so as to reproduce sound from the speaker SK.

(Step ST3)

Next, the output control part 122 makes a decision as to whether or not to display hash tags relating to output-enable contents on the display 112 based on the user's operation received with the operation part 111. Specifically, the posting part 126 makes a decision as to whether or not to generate a hash tag request signal, requesting hash tags relating to output-enable contents from the server 4, based on the user's operation received with the operation part 111. In the present embodiment, the timing of displaying hash tags relating to output-enable contents is determined in advance. For example, the timing may be regarded as the timing at which the mobile terminal 1A receives a user's operation to simultaneously display the posting screen together with content display screen displayed on the display 112. The timing may be regarded as the timing at which the mobile terminal 1A receives a user's operation to start social networking services such as Twitter with the content display screen displayed on the display 112. Alternatively, the timing may be regarded as the timing at which a user changes the type of the displayed content on the content display screen while both the content display screen and the posting screen are simultaneously displayed on the display 112. Moreover, the timing may be regarded as the timing at which the mobile terminal 1A receives the user's posted information while both the content display screen and the posting screen are simultaneously displayed on the display 112. The above timing can be set to other timings. For example, it is possible to name the timing at which a user starts submitting the posted information, the timing at which a user inputs the posted information with the mobile terminal 1A, the timing at which a user operates the mobile terminal 1A to submit the posted information to the server 4, and the timing at which a user exits an operation to submit the posted information in the display-enable condition to display the video content on the display 112 or the output-enable condition to output the audio content from the speaker SK.

(Step ST4)

When the output control part 122 determines to display a hash tag relating to a desired content on the display 112, the posting part 126 generates and transmits a hash tag request signal to the server 4 via the communication part 106. That is, the posting part 126 generates a hash tag request signal based on the video content displayed on the display 112 and the audio content reproduced from the speaker SK. When a user watches a program of a baseball game broadcast by a broadcast station A (not shown) at 19:30 on Oct. 10, 2011, for example, the posting part 126 generates a hash tag request signal including the content ID "0001" representing the broadcast program of a baseball game and the terminal ID of the mobile terminal 1A so as to transmit the hash tag request signal to the server 4 via the communication part 106.

(Step ST5)

The server 4 makes a decision as to whether or not to receive a hash tag request signal from the mobile terminal 1A.

(Step ST6) When the communication part 402 of the server 4 receives a hash tag request signal, the determination part 443 of the controller 404 determines a hash tag corresponding to the hash tag request signal.

In the server 4 implementing the registered hash tag determination method, the determination part 443 determines a hash tag registered in the content-related hash tag table 432 in correspondence with a hash tag request signal. Specifically, the determination part 443 obtains the content-related information "Broadcasting Station A, Baseball Game, Hanshin, Kyojin" corresponding to the content ID "0001" with reference to the broadcast content information table 431 of the storage unit 403 based on the content ID "0001" included in the hash tag request signal. Thereafter, the determination part 443 obtains and determines the hash tag "#yakyu" corresponding to the content-related information "Broadcast Station A, Baseball Game, Hanshin, Kyogin" in correspondence with a hash tag request signal with reference to the content-related hash tag table 432.

In the server 4 implementing the posted hash tag determination method, the determination part 443 determines a hash tag registered in the posting information table 433 as a hash tag corresponding to a hash tag request signal. Specifically, the determination part 433 obtains the content-related information "Broadcasting Station A, Baseball Game, Hanshin, Kyogin" corresponding to the content ID "0001" with reference to the broadcast content information table 431 of the storage unit 403 based on the content ID "0001" included in a hash tag request signal. Thereafter, the determination part 443 obtains the related words corresponding to the content-related information "Broadcasting Station A, Baseball Game, Hanshin, Kyogin" with reference to the content-related hash tag table 432. For example, the determination part 443 obtains the related words "Pitcher, Fielder, Relief Pitcher, Active, Retire, Current Season, Comeback, Dream, Free Agent, Homerun, Hit, Out, Ball, Blouson, . . . " in correspondence with the content-related information "Baseball Game". Thereafter, the determination part 443 searches the posted information including at least one of the related words "Pitcher, Fielder, Relief Pitcher, Active, Retire, Current Season, Comeback, Dream, Free Agent, Homerun, Hit, Out, Ball, Blouson, . . . " with reference to the posted information table 433.

The posted information "Nice Hit!" including the related word "Hit" is stored in the posted information table 433 shown in FIG. 7. The determination part 443 obtains a hash tag "#samurai_japan" included in the posted information "Nice Hit!" with reference to the posted information table 433. The determination part 443 determines the hash tag "#samurai_japan" of the posted information table 433 in correspondence with a hash tag request signal.

(Step ST7)

The determination part 443 determines to output the registered hash tag of the content-related hash tag table 432 or the posted hash tag of the posted information table 433 to the output part (i.e. the display 112) of the mobile terminal 1A, thus transmitting the hash tag to the mobile terminal 1A identified by the terminal ID included in a hash tag request signal.

(Step ST8)

The mobile terminal 1A determines as to whether or not to receive a hash tag from the server 4.

(Step ST9) The mobile terminal 1A displays the hash tag on the posting service display screen of the display 112.

In this connection, the output control part 122 displays a hash tag on the display 112, wherein the hash tag is not necessarily limited to one received from the server 4. For example, when the mobile terminal 1A receives television broadcast content data while receiving hash tags together with names of broadcasting stations, channel numbers, and names of programs, it is possible to preclude steps ST4 to ST8 from the flowchart of FIG. 9 so as to execute step ST9 subsequent to step ST3. That is, the output control part 122 of the mobile terminal 1A may read hash tags, relating to the displayed content of the content display screen of the display 112, so as to display hash tags on the posting service display screen.

Figure 10:
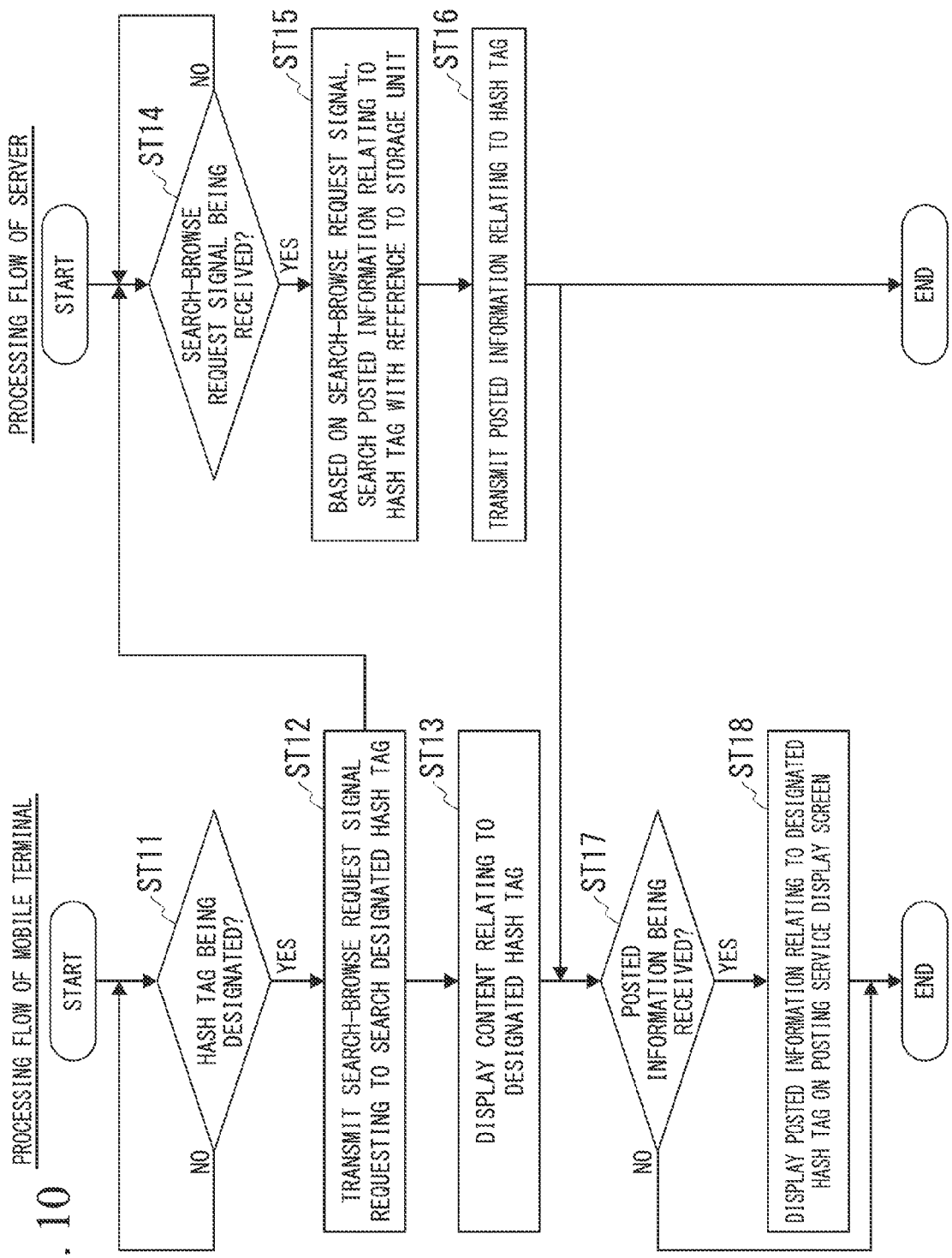
FIG. 10 is a flowchart showing a variation of a content and posted-information link method applied between a mobile terminal and a server.

Next, a variation of the content and posted-information link method applied between the mobile terminal 1A and the server 4 will be described with reference to FIG. 10. In the flowchart shown in FIG. 10, the mobile terminal 1A cooperates with the server 4 to carry out various processes; but this is not a restriction. When the present embodiment needs part of the constituent elements and functions of the server 4 so as to install them in the mobile terminal 1A, the mobile terminal 1A may carry out all the processes of the flowchart of FIG. 10. Alternatively, when the present embodiment needs part of the constituent elements and functions of the mobile terminal 1A so as to install them in the server 4, the server may carry out all the processes of the flowchart of FIG. 10. The flowchart of FIG. 10 will be described below with respect to each of steps.

(Step ST11)

The operation determination part 121 of the controller 102 of the mobile terminal 1A determines as to whether or not a user operates the operation part 11 of the touch panel 101 to give an instruction to search the posted information relating to hash tags. For example, when a user's touch operation is applied to a hash tag displayed in the classified information specification field 1003 on the posting service display screen of the display 112, the operation determination part 121 determines that a user gives an instruction to search the posted information relating to the user's touched hash tag, thus sending the determination result to the output control part 122.

(Step ST12)

The posting part 126 generates a post-browse request signal which requests the server 4 to extract and transmit the posted information, corresponding to the user's designated hash tag, from the previously posted information. The post-browse request signal includes the user's designated hash tag and the terminal ID of the mobile terminal 1A.

(Step ST13)

Based on the determination result of the operation determination part 121, the output control part 122 sends the audio-video content, corresponding to the user's designated hash tag, to the display 112 and the audio signal processing part 124. For example, the output control part 122 displays the video data of the television broadcast content data on the display 112 based on the television broadcast content data which the broadcast data control part 123 receives via the television broadcast receiver 105. With respect to the television broadcast content data including the audio data received with the mobile terminal 1A which is set to reproduce the audio data, the output control part 122 sends the audio data to the audio signal processing part 124 so as to reproduce the audio data from the speaker SK.

For example, when a user designates the hash tag "#Akyoku", the output control part 122 sends the data of a program currently broadcast by the broadcasting station A to the display 112 and the audio signal processing part 124. When a user designates the hash tag "#yakyu", the output control part 122 sends the audio-video content data representing the currently broadcast program of a baseball game to the display 112 and the audio signal processing part 124. Specifically, the output control part 122 determines as to whether or not the information identical to or similar to the user's designated hash tag is included in the content-related information of the currently broadcast programs, or whether or not a character string, which is correlated to the user's designated hash tag in advance, is included in the content-related information of the currently broadcast programs. Upon determining that a character string correlated to the user's designated hash tag is included in the content-related information of the currently broadcast program, the output control part 122 starts to receive the content data of the program correlated to the character string so as to send the content data to the display 112 and the audio signal processing part 124.

(Step ST14)

The server 4 determines as to whether or not to receive a post-browse request signal from the mobile terminal 1A.

(Step ST15) In the server 4, when the communication part 402 receives a post-browse request signal, the search part 444 of the controller 404 searches the posted information corresponding to the post-browse request signal. Specifically, the search part 444 refers to the posted information table 433 based on a hash tag included in the post-browse request signal, thus searching the posted information corresponding to the hash tag.

(Step ST16)

The search part 444 of the server 4 transmits the posted information, i.e. the search result, to the mobile terminal 1A via the communication part 402.

(Step ST17)

The mobile station 1A determines as to whether or not to receive the posted information from the server 4.

(Step ST18)

When the mobile terminal 1A receives the posted information from the server 4, the output control part 122 displays the posted information on the posting service display screen of the display 112.

As described above, according to the content and posted-information link method of the present embodiment, it is possible to send a hash tag corresponding to the content to the output part (i.e. the display 112) with the mobile terminal 1A which is set to display the hash tag relating to the content in the content output condition. For example, it is possible to display a hash tag corresponding to the currently reproduced television broadcast content on the display 112 while the mobile terminal 1A displays the television broadcast content on the display 112 when a user instructs to display the posting service display screen such as Twitter, when a user edits the posting screen, or when a user browses the posting history. Additionally, it is possible to display a hash tag, corresponding to the output-enable television broadcast content such as the content of the other program other than the currently reproduced television broadcast content, on the display 112. Therefore, when a user submits the posted information relating to the television broadcast content to the server 4 while browsing the television broadcast content with the mobile terminal 1A, it is not necessary for a user to input the predetermined hash tag by operating the mobile terminal 1A, but it is possible for a user to automatically input the hash tag relating to the posted information to the mobile terminal 1A by designating the hash tag displayed on the display 112.

By displaying the posted hash tag on the display 112, it is possible for the mobile terminal 1A to display the hash tag, which is not registered but generated by the external server 4, on the display 112 based on the content. Additionally, it is possible for the mobile terminal 1A to prioritize and display the posted hash tag, having the highest posting count, on the display 112. This makes it possible for a user to display the most frequently used hash tag used by users on the display 112 while preventing hash tags having weak relevancy to contents from being displayed on the display 112. Despite the possibility that a user may erroneously input data when inputting hash tags with the mobile terminal 1A, it is possible for the present embodiment to display a plurality of hash tags on the display 112. Since a user is simply required to designate a desired hash tag on the display 112, it is possible to prevent a user from erroneously inputting hash tags.

The prevent invention is not necessarily limited to the foregoing embodiment. The above description refers to the flowchart shown in FIG. 9 which is embodied using the mobile terminal 1A and the server 4, but the flowchart of FIG. 9 can be embodied solely using the mobile terminal 1A. In this case, the mobile terminal 1A may include the storage unit 403 and the controller 404 of the server 4. It is difficult to actually store all the posted information stored in the posted information table 433 of the server 4 in the mobile terminal 1A; hence, it is possible to receive and store the counting result regarding the posted information of the server 4 including the related words and the posted hash tags which are correlated to each other. For example, the server 4 may count the number of hash tags included in the same posted information for each of related words included in the posted information so as to produce a table correlating the related words to the hash tags whose posting counts are equal to or higher than the predetermined threshold. The mobile terminal 1A receives the table from the server 4 so as to store the table in the storage unit 403 in advance. Thus, the determination part 443 incorporated into the mobile terminal 1A is able to obtain the posted hash tags corresponding to the currently output contents with reference to the table in accordance with the posted hash tag determination method.

The above processing will be described specifically. The operation determination part 121 of the mobile terminal 1A determines as to whether or not a user operates the operation part 111 of the touch panel 101 to give an output instruction. Based on the determination result of the operation determination part 121, the output control part 122 of the mobile terminal 1A sends contents to the display 112 and the speaker SK. Based on a user's operation received with the operation part 111, the output control part 122 determines as to whether or not to display hash tags relating to contents on the display 112. When the output control part 122 determines to display hash tags relating to contents on the display 112, the determination part 443 incorporated in the mobile terminal 1A determines hash tags relating to the currently output contents based on the contents IDs of the contents output to display 112 and the speaker SK. Herein, the determination part 443 of the mobile terminal 1A may adopt the registered hash tag determination method or the posted hash tag determination method.

The determination part 443 of the mobile terminal 1A determines the registered hash tags or the posted hash tags, which are obtained according to the hash tag determination method, as the hash tags which should be sent to the output part (i.e. the display 112). The output control part 122 of the mobile terminal 1A displays the hash tags on the posting service display screen of the display 112. Thus, it is possible to install the determination part 443, which determines hash tags output to the output part (i.e. the display 112), in either the mobile terminal 1A or the server 4.

The present embodiment is described such that the touch panel 101 of the mobile terminal 1A is configured of the operation part 111 and the display 112; but this is not a restriction. For example, the display 112 may employ a display not including any touch sensors while the operation part 111 may employ any operation members such as a mouse, a keyboard, and buttons.

The information sharing system (or the communication network system) of the present embodiment includes the mobile terminal 1A and the server 4, each of which may include a computer system therein. The foregoing processes are stored in computer-readable storage media in the form of programs; hence, the computer system reads and executes programs. Herein, the "computer system" may have a CPU, memory, OS (Operating System), and hardware such as peripheral devices. Additionally, the "computer system" may have homepage providing environments (or the homepage display environments) using the WWW (World Wide Web) system.

It is possible to store the programs achieving the steps of the foregoing flowchart or the programs realizing the functions described in the foregoing flowchart in computer-readable storage media, to load the programs in the computer system from the storage media, and to execute the programs with the computer system, thus calculating estimated values regarding the hash tags and the posted information of the searching subjects. In this connection, the "computer-readable storage media" may refer to flexible disks, magneto-optical disks, ROM, rewritable non-volatile memory such as flash memory, portable media such as CD-ROM, and storage devices such as hard disks installed in computer systems.

Additionally, the "computer-readable storage media" may include any devices which can retain programs for a certain time such as volatile memory (e.g. DRAM (Dynamic Random Access Memory)) installed in computer systems serving as servers and clients which receive and transmit programs via networks such as the Internet, telephone lines, and communication lines. The above programs may be transmitted from the storage device of the computers system to the other computer system via transmission media or via waves propagating through transmission media. Herein, the "transmission media" may refer to any media having information transmitting functions such as networks such as the Internet, telephone lines, and communication lines. The above program may achieve part of the functionality of the present invention. Alternatively, it is possible to produce differential programs (or differential files) which are combined with the pre-installed programs of the computer system to achieve the functionality of the present embodiment.

Figure 11:
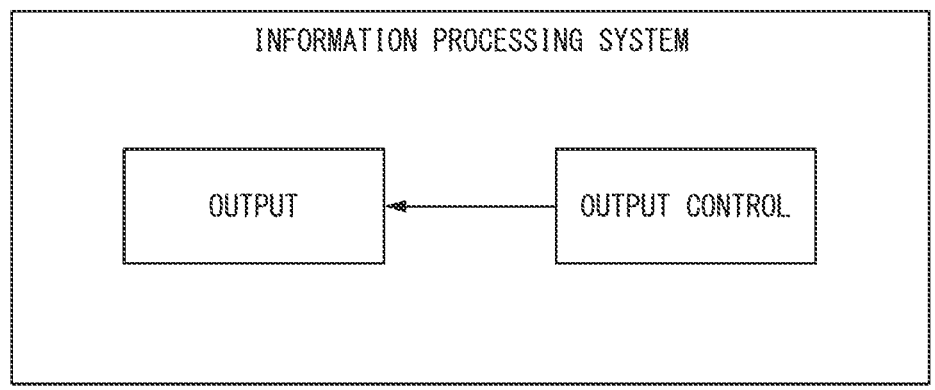
FIG. 11 is a block diagram showing the minimum configuration of an information processing system according to the present invention.

FIG. 11 is a block diagram showing the minimum configuration of the information processing system of the present invention (i.e. the system achieving the information processing corresponding to the content and posted-information link method applied between the mobile terminal 1A and the server 4 via the information sharing system (WEB)). The information processing system includes an output part which outputs desired contents while outputting posted information posted on the WEB, and an output control part which outputs classified information, used to classify posted information in response to output-enable contents, to the output part. In this connection, the information processing system may include the mobile terminal 1A and the server 4, or the information processing system may be configured solely using the mobile terminal 1A.

Lastly, the present invention is not necessarily limited to the foregoing embodiment and variations; hence, the present invention may include any designs and modifications not deviating from the technological creation defined according to the appended claims.

INDUSTRIAL APPLICABILITY

The present invention is designed to display contents and posted information with information processing terminals in a coordinated manner when downloading various contents using information sharing systems (WEB) or when receiving and transmitting posted information. Thus, the present invention is applicable to any environments in which information processing terminals such as smart phones, tablet PCs, and notebook PCs communicate with various server sites via the Internet so as to mutually exchange desired information with each other.

REFERENCE SIGNS LIST 1A, 1B mobile terminal
2 wireless communication network
2A base station
2B exchange
3 Internet
4 server
5 TV station
6 transmission antenna
7 storage media
8 external device
101 touch panel
102 controller
103 storage unit
104 antenna
105 television broadcast receiver
106 communication part
107 timer
111 operation part
112 display
121 operation determination part
122 output control part
123 broadcast data control part
124 audio signal processing part
125 register
126 posting part
131 program store area
132 temporary store area
133 content store area
134 post-related store area
401 operation part
402 communication part
403 storage unit
404 controller
405 clock
431 broadcast content information table
432 content-related hash table
433 posted information table
434 posted hash tag table
441 register
442 counting part
443 determination part
444 search part
SK speaker

The invention claimed is:

1. An information processing terminal communicating with a server configured to store a plurality of classified information used to classify a plurality of posted information posted via an information sharing system, the information processing terminal comprising:
   an output part configured to output a content arbitrarily selected by a user and at least one posted information among the plurality of posted information;
   a storage unit configured to store the plurality of posted information with respect to the content currently outputted on the output part, wherein a plurality of registered hashtags are stored in a first hashtag table in relation to content-related information and a plurality of posted hashtags are stored in a second hashtag table in relation to a plurality of poster identifications; and
   a controller configured to control the output part to output at least one classified information selected from among the plurality of classified information available on the server in connection with the at least one posted information currently output on the output part.

2. The information processing terminal according to claim 1, wherein the controller sends to the server a request signal including a content identification concerning the content or a poster identification concerning the at least one posted information so that the server determines the at least one classified information used to classify the at least one posted information among the plurality of classified information.

3. The information processing terminal according to claim 2, wherein the server determines the at least one classified information with reference to a first hashtag table storing a plurality of registered hashtags in response to the content identification of the request signal or a second table storing a plurality of posted hashtags in response to the poster identification of the request signal.

4. An information processing method applied to a terminal communicating with a server storing a plurality of classified information used to classify a plurality of posted information, the method comprising:
   selectively outputting a content arbitrarily selected by a user and at least one posted information among the plurality of posted information, wherein a plurality of registered hashtags are stored in a first hashtag table in relation to content-related information and a plurality of posted hashtags are stored in a second hashtag table in relation to a plurality of poster identifications;
   and
   selecting at least one classified information depending on a content identification concerning the content or a poster identification concerning the at least one posted information.

5. A content and posted-information link method applied to a terminal communicating with a server storing a plurality of classified information used to classify a plurality of posted information, the method comprising:
   receiving a content;
   browsing at least one posted information among the plurality of posted information in the server, wherein a plurality of registered hashtags are stored in a first hashtag table in relation to content-related information and a plurality of posted hashtags are stored in a second hashtag table in relation to a plurality of poster identifications;

selecting at least one classified information, used to classify the at least one posted information, from among the plurality of classified information in the server; and concurrently displaying the at least one classified information linked with the content.

6. The content and posted-information link method according to claim 5, wherein the terminal concurrently displays a content display screen used to display the desired content and a posting service display screen used to display the at least one posted information.

7. The content and posted-information link method according to claim 6, wherein the server stores a plurality of registered hashtags and a plurality of posted hashtags, and wherein the terminal transmits to the server a request signal including a content identification concerning the content or a poster identification concerning the at least one posted information so that the server at least one registered hashtag depending on the content identification of the request signal or at least one posted hashtag depending on the poster identification of the request signal.

8. The content and posted-information link method according to claim 7, wherein the server checks a post count for each registered hashtag or for each posted hashtag, and wherein server selects the at least one registered hashtag having a higher post count among the plurality of registered hashtags or the at least one posted hashtag having a higher post count among the plurality of posted hashtags.

* * * * *